US007619864B1

(12) United States Patent
Huang

(10) Patent No.: US 7,619,864 B1

(45) Date of Patent: Nov. 17, 2009

(54) REGULATOR SHORT-CIRCUIT PROTECTION CIRCUIT AND METHOD

(75) Inventor: Shengming Huang, Gourock (GB)

(73) Assignee: National Semiconductor Corporation, Santa Clara, CA (US)

( * ) Notice: Subject to any disclaimer, the term of this patent is extended or adjusted under 35 U.S.C. 154(b) by 187 days.

(21) Appl. No.: 11/732,633

(22) Filed: Apr. 4, 2007

(51) Int. Cl.
*H02H 3/00* (2006.01)

(52) U.S. Cl. ............................ 361/88; 361/86; 361/87; 361/92; 361/93.1

(58) Field of Classification Search .................. 361/87, 361/88, 86, 92, 93.1, 93.9
See application file for complete search history.

(56) References Cited

U.S. PATENT DOCUMENTS

| | | | | |
|---|---|---|---|---|
| 3,597,640 | A | 8/1971 | Kubinec | |
| 4,791,314 | A | 12/1988 | Kuo et al. | |
| 5,256,914 | A | 10/1993 | Boomer | |
| 5,525,934 | A | 6/1996 | Chiu et al. | |
| 5,537,064 | A | 7/1996 | Pease et al. | |
| 5,546,260 | A | 8/1996 | Pease et al. | |
| 5,644,264 | A | 7/1997 | Chiu et al. | |
| 5,973,563 | A | 10/1999 | Seven | |
| 6,154,094 | A | 11/2000 | Seven | |
| 6,218,816 | B1 | 4/2001 | Fritz et al. | |
| 6,680,837 | B1 | 1/2004 | Buxton | |
| 6,731,139 | B1 | 5/2004 | Wert et al. | |
| 6,804,102 | B2 * | 10/2004 | Hamon et al. | 361/93.3 |
| 6,819,534 | B2 | 11/2004 | Ding et al. | |
| 6,946,904 | B1 | 9/2005 | Varma et al. | |
| 6,960,940 | B1 | 11/2005 | Wert et al. | |
| 7,031,127 | B1 | 4/2006 | D'Aquino et al. | |
| 7,031,137 | B2 | 4/2006 | Robert | |
| 7,042,280 | B1 * | 5/2006 | Huang et al. | 327/541 |
| 2004/0233604 | A1 | 11/2004 | Beck et al. | |
| 2007/0108949 | A1 * | 5/2007 | Ohoka | 323/271 |
| 2008/0123235 | A1 | 5/2008 | Chiu | |

OTHER PUBLICATIONS

Cheng Xiaojie et al., "A High-Performance Foldback Current Limiting Circuit for Improving Regulators' Latch-up Effect," 2006 IEEE, pp. 2248-2250.

* cited by examiner

*Primary Examiner*—Ronald W Leja
*Assistant Examiner*—Christopher J Clark

(57) ABSTRACT

A signal source generates a reference voltage, and a voltage regulator receives the reference voltage and generates an output voltage and current. During normal operation, a pass element in the voltage regulator generates the output voltage, and a sense element generates a sense voltage. A first voltage detector detects a short-circuit condition using the sense voltage. A second voltage detector deactivates the pass element in response to the detection of the short-circuit condition. The second voltage detector also detects removal of the short-circuit condition and automatically reactivates the pass element. The first voltage detector may detect the short-circuit condition by detecting a drop in the sense voltage. The second voltage detector may detect the removal of the short-circuit condition by applying a test current to a load. Both the first and second voltage sensors may not consume any direct current power during normal operation of the voltage regulator.

20 Claims, 5 Drawing Sheets

REGULATOR SHORT-CIRCUIT PROTECTION CIRCUIT AND METHOD

TECHNICAL FIELD

This disclosure is generally directed to regulator circuits and more specifically to a regulator short-circuit protection circuit and method.

BACKGROUND

Voltage regulators and other power management circuits are routinely used in a wide variety of electronic devices. Over-current protection is often a critical function of these power management circuits. Over-current protection typically helps to protect electronic circuitry from excessive current during short-circuit conditions, which can interfere with, damage, or destroy the electronic circuitry.

A conventional low drop out (LDO) regulator over-current protection circuit 100 is shown in FIG. 1. The circuit 100 includes an error amplifier 102, p-channel metal oxide semiconductor (PMOS) transistors 104-112, n-channel metal oxide semiconductor (NMOS) transistors 114-120, and resistors 122-126. The error amplifier 102 receives two input voltages, a reference voltage $V_{REF}$ and a feedback voltage $V_{FB}$. The error amplifier 102 also generates output signals based on any differences between the voltages $V_{REF}$ and $V_{FB}$.

The transistor 106 represents a pass device, and the transistor 110 represents a sense device. The transistors 104 and 114 form a driver that drives the transistors 106 and 110. The transistor 106 generates an output voltage $V_{OUT}$. The transistor 110 produces a sense current, which is provided to the transistor 118 and mirrored by the transistor 120. A bias signal BIAS_P is provided to the gate of the transistor 112. A voltage at the drain of the transistor 112 is provided to the gates of the transistors 108 and 116, which function as switches. The resistors 124-126 form a voltage divider that generates the feedback voltage $V_{FB}$.

During normal operation, the sense current flowing through the transistor 110 is provided to the transistor 118, and the transistor 120 mirrors the sense current. Also, a bias current flows through the transistor 112, which turns off the transistor 108 and turns on the transistor 116.

During a short-circuit condition (when the output current becomes too high), the current flowing through the transistors 118-120 is greater than the bias current of the transistor 112. This pulls the gate of the transistor 108 down and turns on the transistor 108. As a result, this pulls up the gates of the transistors 106 and 110, thereby limiting the current flowing through the transistors 106 and 110.

In this short-circuit condition, the output current is clamped at a short-circuit current limit, which could be approximately 1.5 to 3 times the maximum load current. Also, the output voltage may drop to below 0.5V. Because of this, the power loss and thermal generation in the circuit 100 could be significantly high, which may increase the risk of thermal-induced device failure.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 2 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 2:
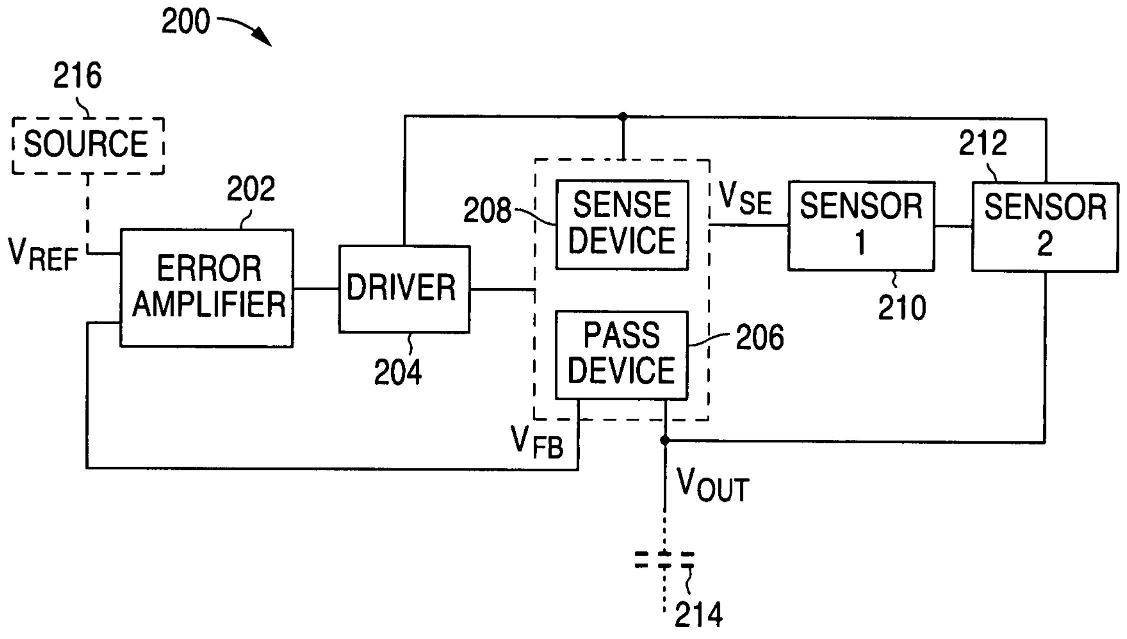
FIG. 2 illustrates an example regulator over-current protection circuit in accordance with this disclosure.

FIG. 2 illustrates an example regulator over-current protection circuit 200 in accordance with this disclosure. The embodiment of the circuit 200 shown in FIG. 2 is for illustration only. Other embodiments of the circuit 200 could be used without departing from the scope of this disclosure.

As shown in FIG. 2, the circuit 200 includes an error amplifier 202. The error amplifier 202 receives two input voltages, a reference voltage $V_{REF}$ and a feedback voltage $V_{FB}$. The reference voltage $V_{REF}$ can be generated in any suitable manner, such as by using a bandgap reference circuit or other source 216. The feedback voltage $V_{FB}$ is generated within the circuit 200. The error amplifier 202 compares the input voltages and generates one or more output signals based on the comparison. The error amplifier 202 includes any suitable structure for comparing input signals and generating output signals based on differences in the input signals.

The one or more outputs of the error amplifier 202 are provided to a driver 204. The driver 204 drives other components in the circuit 200, such as transistors, based on the output(s) provided by the error amplifier 202. The driver 204 includes any suitable structure for driving one or more components of the circuit 200.

In this example, the driver 204 drives a pass device 206 and a sense device 208. The pass device 206 generates an output voltage $V_{OUT}$ and the feedback voltage $V_{FB}$. The output voltage $V_{OUT}$ is generated by the pass device 206 based on how the pass device 206 is driven by the driver 204. For example, the pass device 206 could represent a PMOS transistor coupling a voltage rail to an output voltage node where the output voltage $V_{OUT}$ is provided. Also, the feedback voltage $V_{FB}$ could be generated based on the output voltage $V_{OUT}$ that is produced. The pass device 206 includes any suitable structure for generating the output voltage $V_{OUT}$ and being driven by the driver 204.

The sense device 208 generates a sense current based on how the sense device 208 is driven by the driver 204. For example, the sense device 208 could represent a PMOS transistor coupled between a voltage rail and a ground rail. Current may or may not flow through the PMOS transistor depending on how the sense device 208 is being driven. The sense device 208 includes any suitable structure for generating a sense current.

The pass device 206 and the sense device 208 generate a sense voltage $V_{SE}$ that is provided to a first voltage sensor 210. The first voltage sensor 210 may sense the level of the voltage $V_{SE}$ and enable or disable a second voltage sensor 212 based on the level of the voltage $V_{SE}$. For example, during normal operation, the voltage $V_{SE}$ may be relatively high, and the first voltage sensor 210 may disable the second voltage sensor 212.

During a short-circuit condition, the voltage $V_{SE}$ may be relatively low. The first voltage sensor 210 may sense this short-circuit condition using a current limit and the low sense voltage $V_{SE}$, and the first voltage sensor 210 may enable the second voltage sensor 212. At that point, the second voltage sensor 212 deactivates portions of the circuit 200, such as by deactivating the driver 204 and/or the pass device 206 using switches while the sense device 208 remains on. The second voltage sensor 212 can later detect when the short-circuit condition is removed. The removal of the short-circuit condition can be detected in any suitable manner. For example, a small test current can be applied to the load by the second voltage sensor 212, and the second voltage sensor 212 can detect removal of the short circuit by sensing an increase in the output voltage $V_{OUT}$. In particular embodiments, a timer can be used to prevent the regulator from triggering a fault response under a slow discharging condition of a load capacitor 214 during short-circuit operation. When the removal of the short-circuit condition is detected, the second voltage sensor 212 can automatically reactivate the portions of the circuit 200.

The first voltage sensor 210 includes any suitable structure for sensing a voltage and enabling another sensor. The second voltage sensor 212 includes any suitable structure for sensing short-circuit conditions and adjusting the operation of the circuit 200.

Unlike conventional short-circuit protection circuits that clamp an output current at certain current limits, the circuit 200 switches off a power device (the pass device 206) whenever a short-circuit current limit is reached. This may lead to significantly reduced energy losses and thermal-induced device failure risks during short-circuit operation. The circuit 200 is also capable of detecting when a short-circuit condition has been removed and allows the circuit 200 to return to normal operation automatically. In some embodiments, this short-circuit protection mechanism does not consume any direct current (DC) power during normal operation, and the circuit 200 may operate properly over a range of process and temperature variations.

Although FIG. 2 illustrates one example of a regulator over-current protection circuit 200, various changes may be made to FIG. 2. For example, the different voltage sensors could be combined into a single sensor, such as a single voltage sensor where different portions perform the functions of the different sensors 210-212. Also, the circuit 200 could be coupled to any suitable external circuits or devices and is not limited to use with a load capacitor 214 and an external reference voltage source 216.

Figure 3A:
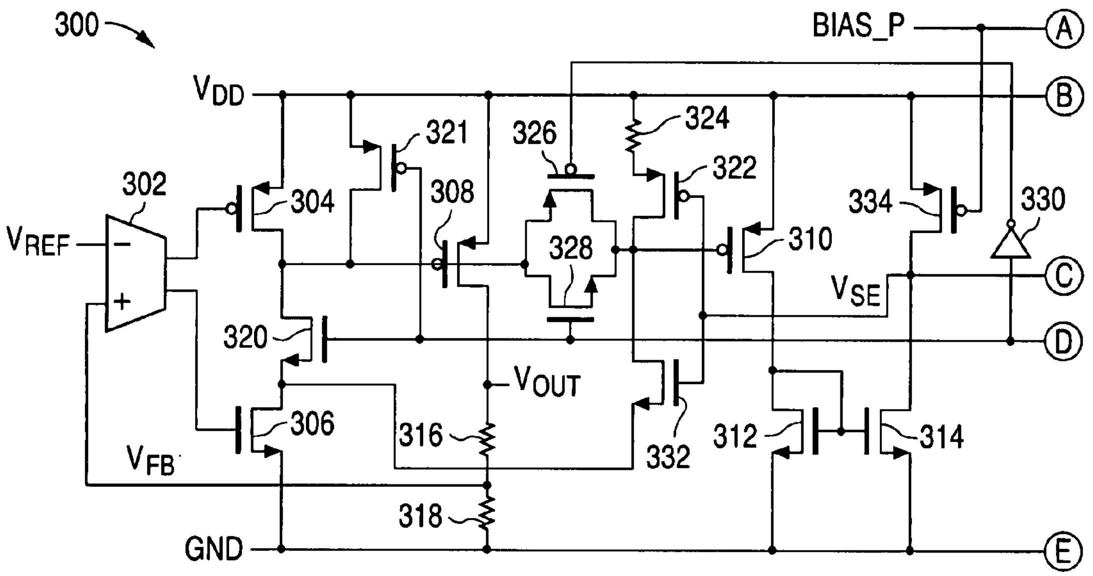
FIGS. 3A and 3B illustrate a more detailed example regulator over-current protection circuit in accordance with this disclosure.
Figure 3B:
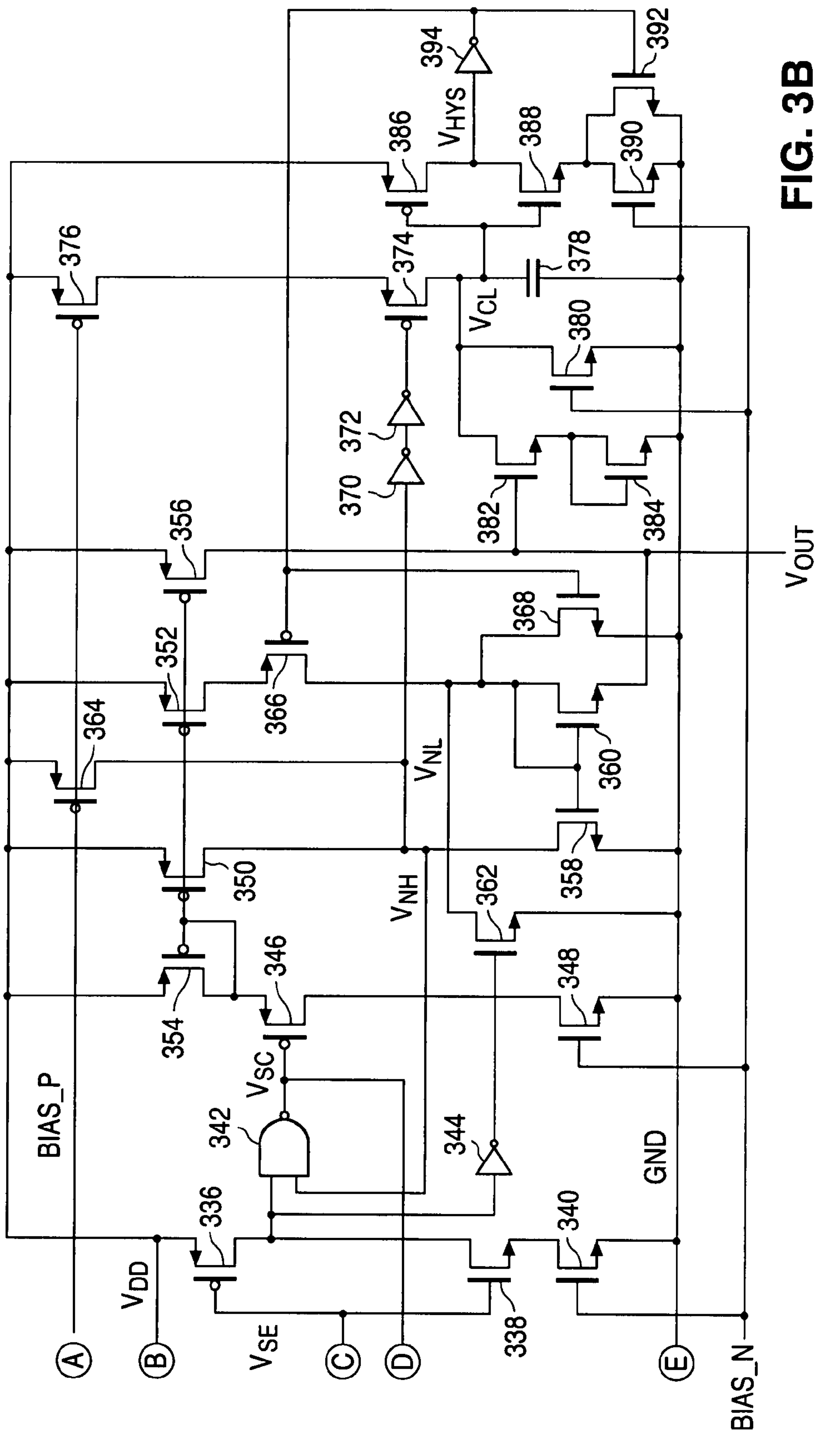

FIGS. 3A and 3B illustrate a more detailed example regulator over-current protection circuit 300 in accordance with this disclosure. The embodiment of the circuit 300 shown in FIGS. 3A and 3B is for illustration only. Other embodiments of the circuit 300 could be used without departing from the scope of this disclosure.

As shown in FIG. 3A, the circuit 300 includes an error amplifier 302. The error amplifier 302 receives and compares two input voltages ($V_{REF}$ and $V_{FB}$) and generates error signals based on the comparison. The error signals are provided to the gates of a PMOS transistor 304 and an NMOS transistor 306, which form a driver. The driver drives a PMOS transistor 308 (a pass device) and a PMOS transistor 310 (a sense device). The transistor 308 is coupled between a voltage rail $V_{DD}$ and a node where an output voltage $V_{OUT}$ is provided. Current through the transistor 310 is provided to an NMOS transistor 312 and is mirrored by an NMOS transistor 314. Two resistors 316-318 are coupled in series between the transistor 308 and a ground rail GND. The resistors 316-318 function as a voltage divider and generate the feedback voltage $V_{FB}$.

An NMOS transistor 320 functions as a switch and selectively couples the transistors 304-306 to one another (effectively enabling or disabling the driver). A PMOS transistor 321 represents a pull-up transistor for the gate of the transistor 308. A PMOS transistor 322, coupled between a resistor 324 and the gate of the transistor 310, represents a pull-up transistor. Its conducting current is limited by the resistor 324, which is coupled between the voltage rail $V_{DD}$ and the transistor 322.

A PMOS transistor 326 and an NMOS transistor 328 function as switches to couple the gate of the transistor 308 to the gate of the transistor 310. These transistors 326-328 effectively operate to couple the gate of the transistor 310 to the output of the driver. The gates of the transistors 320, 321, and 328 receive the same signal, and the gate of the transistor 326 receives an inverted copy of that signal generated by an inverter 330.

An NMOS transistor 332 functions as a current limiting device to limit the pull-down of the gate of the transistor 310 and to couple the gate of the transistor 310 to a node located between the transistors 320 and 306. A PMOS transistor 334 is coupled to a bias signal BIAS_P and can control the operation of the transistors 322 and 332.

As shown here, the circuit 300 generates a sense voltage $V_{SE}$, which is provided to various transistors in FIG. 3B. In FIG. 3B, the voltage $V_{SE}$ is provided to a PMOS transistor 336 and an NMOS transistor 338, which form an inverter. The transistor 338 is coupled in series with an NMOS transistor 340, which has a gate coupled to a bias signal BIAS_N. Collectively, the transistors 336-340 form a first voltage sensor, which operates to detect the presence of the sense voltage $V_{SE}$. When the first voltage sensor is activated by the presence of the sense voltage $V_{SE}$, the first voltage sensor may activate a second voltage sensor. Most of the remaining components is FIG. 3B represent the second voltage sensor.

In this example, the output of the inverter formed by the transistors 336-338 is provided to a NAND gate 342 and an inverter 344. The NAND gate 342 generates an output voltage $V_{SC}$, which is provided to the gates of the transistors 320, 321, 326 (via the inverter 330), and 328 in FIG. 3A. The output of the NAND gate 342 is also provided to the gate of a PMOS transistor 346, which functions as a switch. The transistor 346 is coupled in series with an NMOS transistor 348, which is coupled to ground and has a gate receiving the bias signal BIAS_N.

The circuit 300 also includes two PMOS transistors 350-352, which could have the same size. These transistors 350-352 and a PMOS transistor 356 are controlled by (or mirrored to) a PMOS transistor 354. The transistor 350 is coupled in series with an NMOS transistor 358, which forms a current mirror with an NMOS transistor 360. The transistors 358-360 could also have the same size. The source of the transistor 360 is coupled to the output voltage $V_{OUT}$. A voltage $V_{NH}$ is generated between the transistors 350 and 358 and is provided as an input to the NAND gate 342. A voltage $V_{NL}$ is generated at the drain of an NMOS transistor 362, which receives the output of the inverter 344.

A PMOS transistor 364 acts as a pull-up transistor for the circuit path carrying the voltage $V_{NH}$. A PMOS transistor 366 acts as a switch, selectively coupling the transistor 352 to NMOS transistors 360, 362, and 368. The voltage $V_{NH}$ is provided, via two inverters 370-372, to the gate of a PMOS transistor 374, which functions as a switch. The transistor 374 selectively couples a PMOS transistor 376 to, among other components, a capacitor 378. The capacitor 378 could have any suitable capacitance, such as 0.5 pF.

A voltage $V_{CL}$ is formed at a node between the transistor 374 and the capacitor 378. This node is also coupled to two NMOS transistors 380-382, and the transistor 382 is coupled in series with an NMOS transistor 384. The voltage $V_{CL}$ is also supplied to a hysterias inverter, which is formed from a PMOS transistor 386 and three NMOS transistors 388-392. An output voltage $V_{HYS}$ generated by the hysterias inverter is provided to an inverter 394. The output of the inverter 394 is coupled to the gates of the transistors 366, 368, and 392.

During normal operation (when the output current of the circuit 300 is below a threshold), the voltage $V_{SE}$ can be designed to have a logical high value by setting the proper bias current of the transistor 334 (using the appropriate BIAS_P signal). In this mode of operation, the transistors 321-322 are turned off. Also, the transistors 320, 326-328, and 332 are turned on, and the gates of the transistors 308-310 are coupled together. The voltage $V_{SC}$ is normally at a high logical level, and the voltage $V_{NL}$ is normally at a low logical level. Since the transistor 364 acts as a pull-up transistor, the voltage $V_{NH}$ is normally at a high logical level, and the transistor 374 is turned off. As a result, the voltage $V_{CL}$ is normally at a low logical level.

The output current may eventually reach the threshold or triggering limit, which indicates that a short-circuit condition exists. The triggering limit may be set by the transistors 310-314 and 334. When this occurs, the drop in the voltage $V_{SE}$ may be significantly larger than the threshold voltage of the transistor 336. The output of the inverter formed by the transistors 336-338 becomes a high logical value due to the connection of bias current from the transistor 340 to the source of the transistor 338. In effect, the first voltage detector outputs a signal indicating that the voltage $V_{SE}$ is relatively low. This causes the voltage $V_{SC}$ to go low and turns off the transistor 362. As a result, the gate of the transistor 310 is disconnected from the gate of the transistor 308. The transistor 308 turns off, while the transistor 310 remains on to provide enough current to keep the voltage $V_{SE}$ unchanged. At this point, equal current starts to flow through the transistors 350-352.

If the output of the circuit 300 is shorted to ground directly, the voltage $V_{OUT}$ drops to nearly ground potential instantly due to very high discharge current of an output capacitor. In this case, the gate-source voltage $V_{GS\_358}$ of the transistor 358 can be given as:

$$V_{GS\_358}=V_{NL}=V_{GS\_360}+V_{OUT}\approx V_{GS\_360}=V_T+[I_{360}*L/(kW)]^{1/2} \quad (1)$$

Here, $V_{GS\_360}$ represents the gate-source voltage of the transistor 360, $V_T$ represents the NMOSFET threshold voltage, $I_{360}$ represents the current through the transistor 360, L and W are the channel length and channel width of the transistor 360, and k is a constant. Based on this, the current flowing through the transistor 358 can be defined as:

$$I_{358}=kW/L*(V_{GS\_358}-V_T)^2=I_{360}=I_{352}=I_{350}. \quad (2)$$

Here, $I_{350}$, $I_{352}$, and $I_{358}$ represent the currents through the transistors 350, 352, and 358, respective. During this condition, the voltage $V_{NH}$ remains at a high logical value due to pull-up current flowing through the transistor 364, and $V_{SC}$ is kept at a low logical value. The transistor 308 therefore is kept off in the short-circuit condition.

Once the short-circuit condition is removed, the current flowing through the transistor 356 generates a voltage drop across the load, and $V_{OUT}=I_{356}*R_{LOAD}$ (where $I_{356}$ represents the current through the transistor 356 and $R_{LOAD}$ represents the resistance of the load). At this point, the gate-source voltage of the transistor 358 can be given as:

$$V_{GS\_358}=V_{NL}=V_{GS\_360}+V_{OUT}=V_T+[I_{360}*L/(kW)]^{1/2}+I_{356}*R_{LOAD}=V_T+[I_{350}*L/(kW)]^{1/2}+I_{356}*R_{LOAD}. \quad (3)$$

If $I_{356}*R_{LOAD}$ is large enough, $I_{358}>I_{350}+I_{364}$. As a result, the following can be obtained:

$$kW/L*([I_{350}*L/(kW)]^{1/2}+I_{356}*R_{LOAD})^2>I_{350}+I_{364}. \quad (4)$$

Also, the voltage $V_{NH}$ changes its state to a low logical value for a period of time, and the voltage $V_{SC}$ goes back to a high logical value. Therefore, the transistor 308 turns on automatically. After that, the voltage $V_{SE}$ goes back to a normal logical high value to keep the voltage $V_{SC}$ high. The voltage $V_{NL}$ goes back to a low logical value, and the voltage $V_{NH}$ goes high again. In normal applications, $R_{LOAD}$ may be high once the transistor 308 is turned off ($V_{OUT}=0$), and the required current $I_{356}$ would be low. The maximum current $I_{356}$ can be solved using Equation (4) under the condition $R_{LOAD}=R_{LOAD(min)}=I_{LOAD(max)}/V_{OUT}$, where $I_{LOAD(max)}$ represents the maximum load current and $V_{OUT}$ represent the normal output voltage of the regulator. For example, if $LOAD_{(max)}=300$ MA, $V_{OUT}=2.8$V, W=10 μm, L=5 μm, $I_{350}=3$ μA, and $I_{364}=0.6$ μA, then $I_{356(max)}=1.07$ mA.

If the output of the circuit 300 is not shorted directly to ground during an over-current condition, a certain resistance (such as 1Ω or 2Ω) may exist between $V_{OUT}$ and ground. In this case, $V_{OUT}$ may not drop approximately to ground potential instantly due to limited discharge current. However, the voltage $V_{NL}$ may be high enough to cause the voltage $V_{NH}$ to drop to a low logical value, and the voltage $V_{SC}$ goes back high after an initial low. As a result, the transistor 308 turns back on after an initial off period. However, the voltage $V_{OUT}$ may be significantly lower than its normal value due to the over-current condition. During this time, output current may be limited as is done in conventional protection circuits. Unlike conventional circuits, however, the transistor 374 turns on, and the capacitor 378 is charged by current flowing through the transistors 374-376. The voltage $V_{CL}$ can be discharged by the transistor 380 at the same time. As a result, bias current from the transistor 376 is designed to be higher than the current through the transistor 380. It should be pointed out that if $V_{OUT}$ is higher than $2V_T$ during a short-circuit condition, the output current may be clamped at a certain limit all the time during short-circuit operation. Therefore, the transistor 384 may not be required for low output voltage options of the regulator (such as when $V_{OUT}<1.5$V).

Once the voltage $V_{CL}$ is high enough, the output $V_{HYS}$ of the hysterias inverter goes low, the transistor 366 turns off, the transistor 368 turns on, and the voltage $V_{NL}$ goes to zero rapidly or immediately. The voltage $V_{NH}$ then goes back high, the voltage $V_{SC}$ goes back low, and the transistor 308 is turned off again. The transistor 374 is then turned off, and the transistor 380 continues to discharge the capacitor 378.

As noted above, the transistors 386-392 form a hysterias inverter, and its minimum $V_{IH}$ may be much higher than its maximum $V_{IL}$. As a result, the discharging time of the capacitor 378 can be extended to allow the voltage $V_{HYS}$ to change to high from low. This discharging time of the capacitor 378 can be designed longer than that of the output capacitor to ensure that $V_{OUT}$ can drop to nearly ground level during this time period. After $V_{HYS}$ is at a high logical value, the transistor 366 turns on, and the transistor 368 turns off. At this point, $V_{OUT}$ is nearly at ground level, and $I_{358}=I_{360}=I_{352}=I_{350}$ as discussed above. Therefore, $V_{NH}$ is still kept at a high logical value to ensure a low $V_{SC}$ voltage, which turns off the transistor 308 during short-circuit operation. It should be noted that the transistors 350-356, 364, and 376 may operate only under short-circuit conditions, so this circuitry does not consume DC power during normal conditions.

In some embodiments, the circuit 300 could form part of a larger circuit, device, or system. For example, the circuit 300 could reside on a printed circuit board or other substrate. The circuit 300 could also be coupled to a signal source for providing the reference voltage $V_{REF}$, such as a bandgap reference circuit. The circuit 300 could further provide the output voltage $V_{OUT}$ to any suitable destination, such as a load capacitor or other load.

Although FIGS. 3A and 3B illustrate an example detailed regulator over-current protection circuit 300, various changes may be made to FIGS. 3A and 3B. For example, other logic could be used to implement the various functions performed by the circuitry in FIGS. 3A and 3B.

Figure 4:
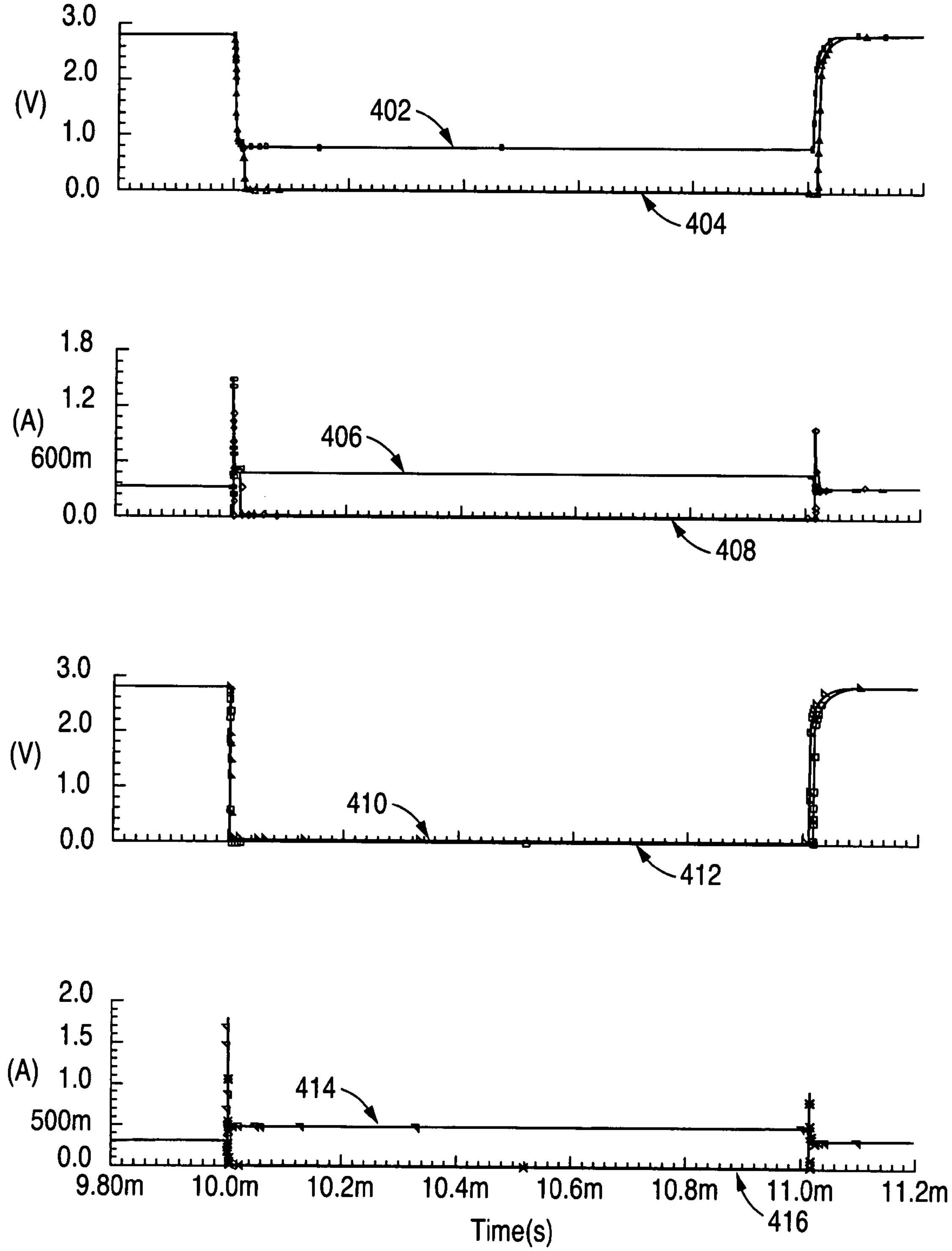
FIGS. 4 and 5 illustrate example simulation results associated with the regulator over-current protection circuit of FIGS. 3A and 3B in accordance with this disclosure.
Figure 5:
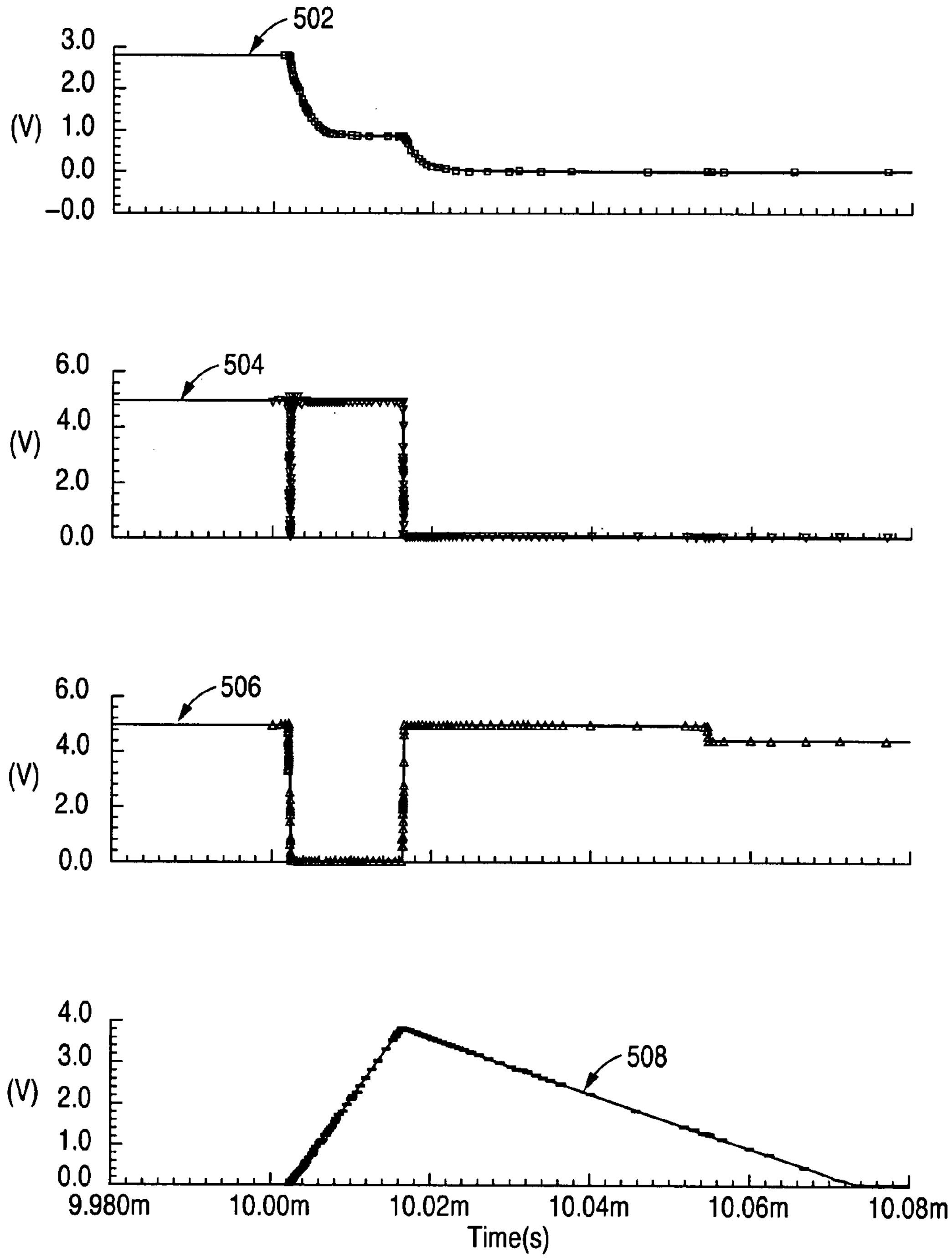

FIGS. 4 and 5 illustrate example simulation results associated with the regulator over-current protection circuit 300 of FIGS. 3A and 3B in accordance with this disclosure. The simulation results shown in FIGS. 4 and 5 are for illustration only. The over-current protection circuit 300 could operate in any other or additional manner.

Figure 1:
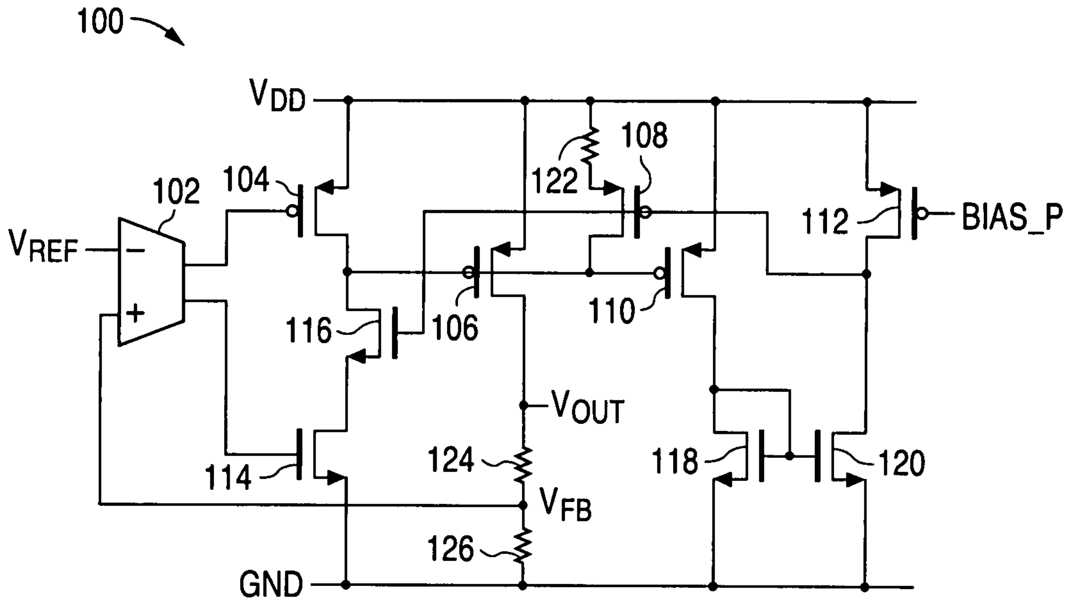
FIG. 1 (PRIOR ART)
FIG. 1 illustrates a conventional regulator over-current protection circuit.

The simulation results in FIG. 4 compare the operation of the circuit 300 of FIG. 3 with the operation of the conventional circuit 100 of FIG. 1. The simulation results in FIG. 5 depict various signals in the circuit 300 during operation. The simulations were carried out based on CMOS9t5v technology. The results shown in FIGS. 4 and 5 assume $V_{OUT}$=2.8V and $I_{LOAD(max)}$=320 mA.

In FIG. 4, lines 402-404 represent the output voltages of the circuit 100 and the circuit 300, respectively, during a short-circuit condition having a 2Ω resistance. Also, lines 406-408 represent the power supply currents of the circuit 100 and the circuit 300, respectively, during a short-circuit condition having a 2Ω resistance. As shown here, the output voltage in the circuit 300 drops to approximately 0V during this short-circuit condition, while the output voltage in the circuit 100 remains closer to 1V. Also, the power supply current in the circuit 300 drops to approximately 0 A during this short-circuit condition, while the power supply current in the circuit 100 remains closer to 500 mA.

Similarly, lines 410-412 represent the output voltages of the circuit 100 and the circuit 300, respectively, during a short-circuit condition having a 20 mΩ resistance. Also, lines 414-416 represent the power supply currents of the circuit 100 and the circuit 300, respectively, during a short-circuit condition having a 20 mΩ resistance. Again, the output voltage in the circuit 300 drops to approximately 0V during this short-circuit condition, while the output voltage in the circuit 100 is slightly higher. Also, the power supply current in the circuit 300 drops to approximately 0 A during this short-circuit condition, while the power supply current in the circuit 100 remains closer to 500 mA.

In FIG. 5, line 502 represents the output voltage $V_{OUT}$, line 504 represents the voltage $V_{SC}$, line 506 represents the voltage $V_{NH}$, and line 508 represents the voltage $V_{CL}$ in the circuit 300. These values are obtained during a short-circuit condition having a 2Ω resistance that begins at 10.00 ms. As shown here, the output voltage $V_{OUT}$ initially drops to a lower level during the short-circuit condition before falling to zero when the pass element (transistor 308) is turned off. The voltage $V_{SC}$ initially drops low and then quickly goes back high when the short-circuit condition begins, before dropping to zero after the output voltage $V_{OUT}$ reaches its non-zero lower level. The voltage $V_{NH}$ goes low when the short-circuit condition begins and then goes high again when the voltage $V_{SC}$ drops to zero. The voltage $V_{CL}$ increases rapidly after the short-circuit condition begins and then starts to slowly discharge as the output voltage $V_{OUT}$ and the voltage $V_{SC}$ go to zero.

The simulation results in FIG. 5 identify how the circuit 300 operates with a short-circuit path having a 2Ω resistance. The simulation results in FIG. 4 show that the circuit 300 is more efficient at limiting voltage and current during a short-circuit condition compared to the circuit 100.

Although FIGS. 4 and 5 illustrate examples of simulation results associated with the regulator over-current protection circuit 300 of FIGS. 3A and 3B, various changes may be made to FIGS. 4 and 5. For example, the circuit 300 could provide any other level of voltage or current during a short-circuit condition depending on the particular implementation. Also, the voltages in the circuit 300 could have any other suitable values or behaviors depending on the particular implementation.

Figure 6:
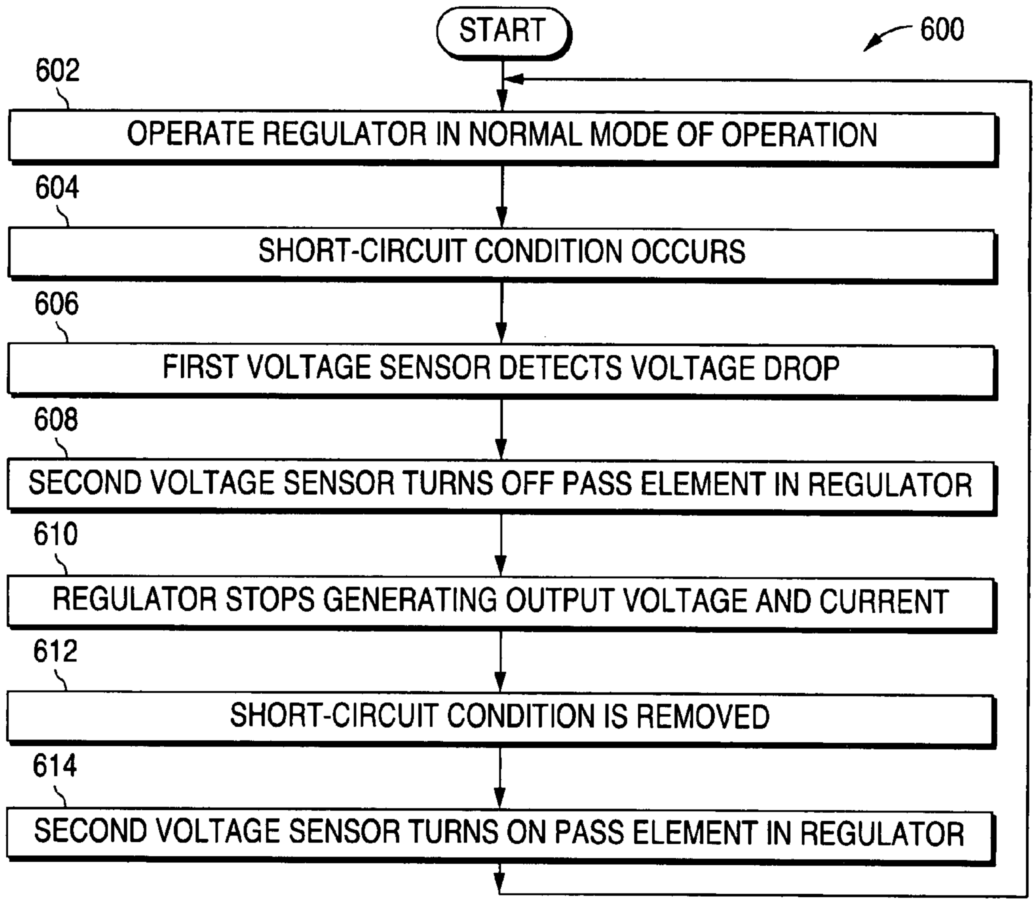
FIG. 6 illustrates an example method for regulator over-current protection in accordance with this disclosure.

FIG. 6 illustrates an example method 600 for regulator over-current protection in accordance with this disclosure. The embodiment of the method 600 in FIG. 6 is for illustration only. Other embodiments of the method 600 could be used without departing from the scope of this disclosure. Also, for ease of explanation, the method 600 is described with respect to the circuit 200 of FIG. 2. The method 600 could be used with any other suitable circuit, device, or system.

A regulator operates in a normal mode of operation at step 602. This could include, for example, the circuit 200 operating to compare a reference voltage $V_{REF}$ to a feedback voltage $V_{FB}$ and generating a desired output voltage $V_{OUT}$.

A short-circuit condition occurs at step 604. This could include, for example, a short circuit forming between the output voltage $V_{OUT}$ and ground. The output voltage $V_{OUT}$ could be shorted to ground directly or indirectly, such as through a connection having a small resistance.

When the short-circuit condition occurs, a first voltage sensor detects a voltage drop at step 606. This could include, for example, the first voltage sensor 210 detecting a drop in the sense voltage $V_{SE}$ generated by the circuit 200. This could also include the first voltage sensor 210 enabling the second voltage sensor 212.

A second voltage sensor turns off a pass element in the regulator at step 608. This could include, for example, the second voltage sensor 212 opening switches associated with the driver 204 and opening switches coupling the pass device 206 to the sense device 208. This causes the regulator to stop generating an output voltage and current at step 610.

The short-circuit condition is removed at step 612. At that point, the second voltage sensor detects the removal of the short-circuit condition and turns on the pass element in the regulator at step 614. This could include, for example, the second voltage sensor 212 closing switches associated with the driver 204 and closing switches coupling the pass device 206 to the sense device 208. This causes the regulator to begin generating the output voltage and current again at step 602.

Although FIG. 6 illustrates one example of a method 600 for regulator over-current protection, various changes may be made to FIG. 6. For example, the circuit 200 could operate in any other or additional manner to provide over-current protection.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A method comprising:

generating an output voltage using a pass element and a sense voltage using a sense element in a voltage regulator, wherein the pass element comprises a first transistor and the sense element comprises a second transistor;

detecting a short-circuit condition using the sense voltage;

deactivating the pass element in the voltage regulator and opening at least one first switch that couples a gate of the first transistor to a gate of the second transistor in response to detecting the short-circuit condition;

detecting removal of the short-circuit condition; and automatically reactivating the pass element in the voltage regulator and closing the at least one first switch in response to detecting the removal of the short-circuit condition.

2. The method of claim 1, wherein:

generating the sense voltage comprises generating a higher sense voltage before the short-circuit condition occurs; and detecting the short-circuit condition comprises detecting a lower sense voltage after the short-circuit condition occurs.

3. The method of claim 1, wherein detecting the removal of the short-circuit condition comprises applying a test current to a load coupled to an output of the regulator.

4. The method of claim 1, wherein:

a driver comprising third transistors drives the pass element and the sense element during generation of the output voltage; and the gates of the first and second transistors are coupled to the driver during generation of the output voltage.

5. The method of claim 4, wherein deactivating the pass element comprises:

opening at least one second switch between the third transistors in the driver.

6. The method of claim 5, wherein automatically reactivating the pass element comprises:

closing the at least one second switch between the third transistors in the driver.

7. The method of claim 1, wherein:

detecting the short-circuit condition comprises using a first voltage sensor;

deactivating the pass element, detecting the removal of the short-circuit condition, and automatically reactivating the pass element comprises using a second voltage sensor; and further comprising enabling and disabling the second voltage sensor using the first voltage sensor.

8. A circuit comprising:

first circuitry comprising a pass element operable to generate an output voltage and a sense element operable to generate a sense voltage, wherein the pass element comprises a first transistor and the sense element comprises a second transistor;

second circuitry operable to detect a short-circuit condition using the sense voltage; and third circuitry operable to (i) deactivate the pass element and open at least one first switch that couples a gate of the first transistor to a gate of the second transistor in response to the detection of the short-circuit condition, (ii) detect removal of the short-circuit condition, and (iii) automatically reactivate the pass element in response to the detection of the removal of the short-circuit condition.

9. The circuit of claim 8, wherein:

the first circuitry is operable to generate a higher sense voltage before the short-circuit condition occurs; and the second circuitry is operable to detect a lower sense voltage after the short-circuit condition occurs.

10. The circuit of claim 8, wherein the third circuitry is operable to apply a test current to a load at an output to detect the removal of the short-circuit condition.

11. The circuit of claim 8, wherein the first circuitry comprises:

an error amplifier; and a driver comprising third transistors operable to receive output signals from the error amplifier; and wherein the first and second transistors have their gates coupled to the driver.

12. The circuit of claim 11, wherein the third circuitry is operable to deactivate the pass element by:

opening at least one second switch between the third transistors in the driver.

13. The circuit of claim 12, wherein the third circuitry is operable to automatically reactivate the pass element by:

closing the at least one second switch between the third transistors in the driver.

14. The circuit of claim 8, wherein:

the second circuitry comprises a first voltage sensor;

the third circuitry comprises a second voltage sensor; and the first voltage sensor is operable to enable and disable the second voltage sensor.

15. The circuit of claim 14, wherein both the first and second voltage sensors do not consume any direct current power when the short-circuit condition does not exist.

16. A system comprising:

a signal source operable to generate a reference voltage; and a voltage regulator operable to receive the reference voltage and generate an output voltage and an output current, the voltage regulator comprising:

a pass element operable to generate the output voltage, the pass element comprising a first transistor;

a sense element operable to generate a sense voltage, the sense element comprising a second transistor;

a first voltage detector operable to detect a short-circuit condition using the sense voltage; and a second voltage detector operable to (i) deactivate the pass element and open at least one first switch that couples a gate of the first transistor to a gate of the second transistor in response to the detection of the short-circuit condition, (ii) detect removal of the short-circuit condition, and (iii) automatically reactivate the pass element in response to the detection of the removal of the short-circuit condition.

17. The system of claim 16, wherein the voltage regulator further comprises:

an error amplifier operable to receive the reference voltage and a feedback voltage; and a driver operable to receive output signals from the error amplifier and drive the pass element.

18. The system of claim 16, wherein:

the voltage regulator is operable to generate a higher sense voltage before the short-circuit condition occurs; and the first voltage sensor is operable to enable the second voltage sensor in response to detecting a lower sense voltage after the short-circuit condition occurs.

19. The system of claim 17, wherein:

the driver comprises third transistors operable to receive the output signals from the error amplifier;

the second voltage sensor is operable to open one or more second switches between the third transistors to deactivate the pass element and to close the one or more second switches to reactivate the pass element; and the second voltage sensor is operable to detect the removal of the short-circuit condition by applying a test current to a load coupled to an output of the voltage regulator.

20. The system of claim 16, further comprising:

a load coupled to an output of the voltage regulator and operable to receive and use the output voltage.

* * * * *